United States Patent
Heckmeier et al.

(10) Patent No.: US 6,217,953 B1
(45) Date of Patent: *Apr. 17, 2001

(54) LIQUID-CRYSTALLINE MEDIUM

(75) Inventors: Michael Heckmeier, Bensheim; Matthias Bremer, Darmstadt; Dagmar Klement, Gross-Zimmern, all of (DE)

(73) Assignee: Merck Patent GmbH, Darmstadt (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/343,402

(22) Filed: Jun. 30, 1999

(30) Foreign Application Priority Data

Jun. 30, 1998 (DE) .............................. 198 29 080

(51) Int. Cl.$^7$ .......................... C09K 19/30; C09K 19/12; G02F 1/133
(52) U.S. Cl. ................. 428/1.1; 252/299.63; 252/299.66
(58) Field of Search .......................... 252/299.01, 299.66, 252/299.63; 428/1.1

(56) References Cited

U.S. PATENT DOCUMENTS 5,384,065 * 1/1995 Geeharr et al. ............... 252/299.63
6,066,268 * 5/2000 Ichinose et al. ............... 252/299.63

* cited by examiner

Primary Examiner—Shean C. Wu
(74) Attorney, Agent, or Firm—Millen White Zelano & Branigan

(57) ABSTRACT

The invention relates to a liquid-crystalline medium based on a mixture of polar compounds of negative dielectric anisotropy which comprises at least one compound of the formula I1 and/or I2

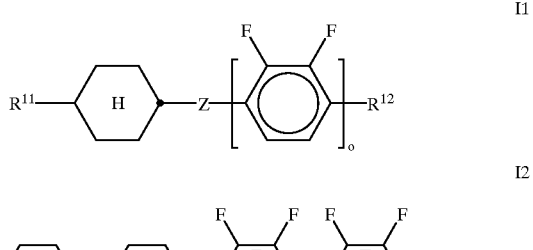

and at least one compound of the formula I3

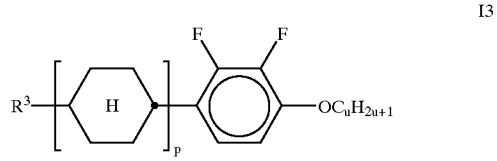

in which
$R^{11}, R^{12}, R^2, R^3, Z, Q, o, p, t$, and $u$ are as defined in claim 1,
and the use thereof for an active matrix display based on the ECB effect.

17 Claims, No Drawings

LIQUID-CRYSTALLINE MEDIUM

The invention relates to a liquid-crystalline medium based on a mixture of polar compounds of negative dielectric anisotropy which comprises at least one compound of the formula I1 and/or I2

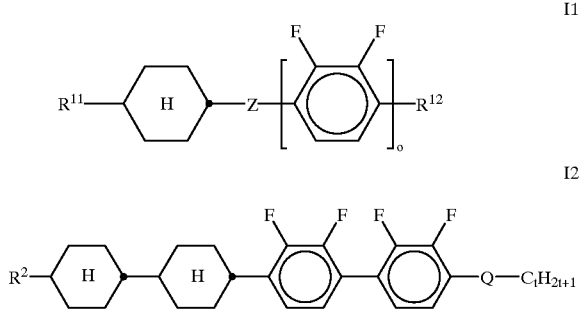

and at least one compound of the formula I3

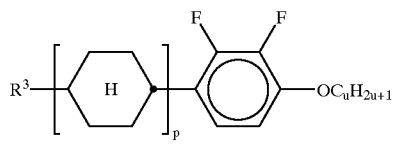

in which
$R^{11}$, $R^2$ and $R^3$ are each, independently of one another, an unsubstituted alkyl or alkenyl radical having 1 to 12 carbon atoms, in which one or more non-adjacent $CH_2$ groups may be replaced by a radical selected from the group consisting of —O—, —S— and —C≡C—,
$R^{12}$ is $C_sH_{2s+1}$, —O—C($CH_3$)=$CH_2$ or —O—($CH_2$)$_b$CH=$CH_2$
Q is —O— or a single bond,
Z is —$C_2H_4$—, —CH=CH— or a single bond,
s, t and u are each, independently of one another, from 1 to 6,
o and p are each, independently of one another, 1 or 2, and
b is 0, 1, 2 or 3.

Such media are particularly suitable for electro-optical displays with active matrix addressing based on the ECB effect.

BACKGROUND OF THE INVENTION

The principle of electrically controlled birefringence, the ECB effect or alternatively DAP effect (deformation of aligned phases), was described for the first time in 1971 (M. F. Schieckel and K. Fahrenschon, "Deformation of nematic liquid crystals with vertical orientation in electrical fields", Appl. Phys. Lett. 19 (1971), 3912). This was followed by papers by J. F. Kahn (Appl. Phys. Lett. 20 (1972), 1193) and G. Labrunie and J. Robert (J. Appl. Phys. 44 (1973), 4869).

The papers by J. Robert and F. Clerc (SID 80 Digest Techn. Papers (1980), 30), J. Duchene (Displays 7 (1986), 3) and H. Schad (SID 82 Digest Techn. Papers (1982), 244) have shown that liquid-crystalline phases must have high values for the ratio between the elastic constants $K_3/K_1$, high values for the optical anisotropy Δn and values for the dielectric anisotropy Δε of from −0.5 to −5 in order to be suitable for high-information display elements based on the ECB effect. Electro-optical display elements based on the ECB effect have a homeotropic edge alignment.

Technical use of this effect in electro-optical display elements requires LC phases which must satisfy a multiplicity of requirements. Particularly important here are chemical resistance to moisture, air and physical effects, such as heat, radiation in the infrared, visible and ultraviolet regions and direct and alternating electric fields.

Technically suitable LC phases are furthermore required to have a liquid-crystalline mesophase in a suitable temperature range and low viscosity.

None of the series of compounds having a liquid-crystalline mesophase which have been disclosed hitherto includes a single compound which meets all these requirements. In general, therefore, mixtures of from two to 25, preferably from three to 18, compounds are prepared in order to obtain substances which can be used as LC phases. However, optimum phases cannot be prepared easily in this way, since no liquid-crystalline materials of significantly negative dielectric anisotropy and adequate long-term stability were hitherto available.

Matrix liquid-crystal displays (MLC displays) are known. Examples of nonlinear elements which can be used for individual switching of individual pixels are active elements (i.e. transistors). This is then referred to as an "active matrix", and a differentiation can be made between two types:
1. MOS (metal oxide semiconductor) transistors on silicon wafers as substrate.
2. Thin-film transistors (TFTs) on a glass plate as substrate.

In the case of type 1, the electro-optical effect used is usually dynamic scattering or the guest-host effect. The use of single-crystal silicon as the substrate material limits the display size, since even modular assembly of various part-displays results in problems at the joints.

In the case of the more promising type 2, which is preferred, the electro-optical effect used is usually the TN effect.

A differentiation is made between two technologies: TFTs comprising compound semiconductors, such as, for example CdSe, or TFTs based on polycrystalline or amorphous silicon. Intensive work is being carried out worldwide on the latter technology.

The TFT matrix is applied to the inside of one glass plate of the display, while the other glass plate carries the transparent counterelectrode on the inside. Compared with the size of the pixel electrode, the TFT is very small and has virtually no adverse effect on the image. This technology can also be extended to fully colour-compatible image displays, where a mosaic of red, green and blue filters is arranged in such a way that each filter element is located opposite a switchable pixel.

The TFT displays disclosed hitherto usually operate as TN cells with crossed polarizers in transmission and are illuminated from the back.

The term MLC displays here covers any matrix display containing integrated nonlinear elements, i.e. in addition to the active matrix, also displays containing passive elements, such as varistors or diodes (MIM=metal-insulator-metal).

MLC displays of this type are particularly suitable for TV applications (for example pocket TV sets) or for high-information displays in automobile or aircraft construction. In addition to problems with respect to the angle dependence of the contrast and the response times, problems arise in MLC displays owing to inadequate resistivity of the liquid-crystal mixtures [TOGASHI, S., SEKIGUCHI, K., TANABE, H., YAMAMOTO, E., SORIMACHI, K., TAJIMA, E., WATANABE, H., SHIMIZU, H., Proc. Eurodisplay 84, September 1984: A 210–288 Matrix LCD Controlled by Double Stage Diode Rings, p. 141 ff, Paris; STROMER, M., Proc. Eurodisplay 84, September 1984: Design of Thin Film Transistors for Matrix Addressing of Television Liquid Crystal Displays, p. 145 ff, Paris]. With decreasing resistance, the contrast of an MLC display drops. Since the resistivity of the liquid-crystal mixture generally drops over the life of an MLC display owing to interaction with the internal surfaces of the display, a high (initial) resistance is very important for displays which must have acceptable resistance values over a long service life.

The disadvantage of the MLC-TN displays disclosed hitherto is due to their comparatively low contrast, relatively high viewing-angle dependence and the difficulty of generating grey shades in these displays. EP 0 474 062 discloses MLC displays based on the ECB effect. The LC mixtures described therein are based on 2,3-difluorophenyl derivatives containing ester, ether or ethyl bridges and have low values of the "voltage holding ratio" (HR) after UV exposure. DE 44 26 798 discloses ECB mixtures which comprise compounds of the formula I1.

There thus continues to be a great demand for MLC displays having very high resistivity at the same time as a large working-temperature range, short response times and low threshold voltage which can be used to produce various grey shades.

SUMMARY OF THE INVENTION

The invention has an object of providing MLC displays based on the ECB effect which do not have the abovementioned disadvantages, or only do so to a lesser extent, and at the same time have very high resistivities.

Upon further study of the specification and appended claims, further objects and advantages of this invention will become apparent to those skilled in the art.

It has now been found that objects of the invention can be achieved if nematic liquid-crystal mixtures comprising at least one compound of the formula I1 and/or I2 and I3 are used in these display elements.

The invention thus includes a liquid-crystalline medium based on the mixture of polar compounds of negative dielectric anisotropy which comprises at least one compound of the formula I1 and/or I2 and at least one compound of the formula I3.

The mixture according to the invention has very favourable values for the capacitive threshold, relatively high values for the holding ratio and at the same time very good low-temperature stability. The higher the proportion of compounds containing an

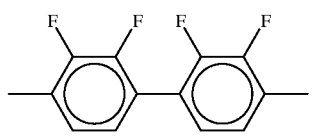

unit in the mixture, the higher the clearing point and the Δn value of the mixture.

Some preferred embodiments are shown below:
a) a medium which additionally comprises one or more compounds of the formula II:

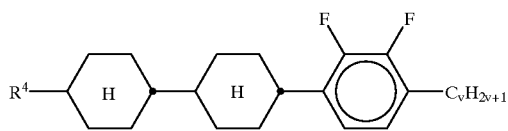

in which
$R^4$ is as defined for $R^{11}$ or $R^2$, and
v is from 1 to 6.
b) A medium which additionally comprises one or more compounds of the formula III:

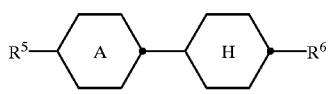

in which
$R^5$ and $R^6$ are each, independently of one another, as defined for $R^{11}$ and $R^2$ above, and

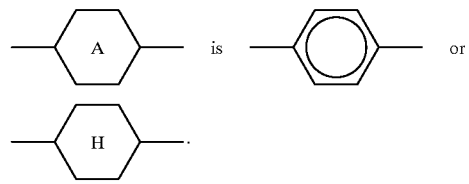

c) A medium which essentially consists of four or more compounds selected from the formulae I1 and/or I2 and I3.
d) A medium which comprises at least two compounds of the formula I3.
e) A medium in which the proportion of compounds of the formula I1 and/or I2 in the mixture as a whole is at least 10% by weight.
f) A medium in which the proportion of compounds of the formula I3 in the mixture as a whole is at least 30% by weight.
g) A medium in which the proportion of compounds of the formula II in the mixture as a whole is at least 10% by weight.
h) A medium in which the proportion of compounds of the formula III in the mixture as a whole is at least 5% by weight.
i) A medium which comprises at least one compound selected from the formulae IIIa to IIIf:

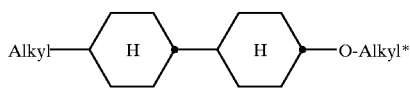

-continued

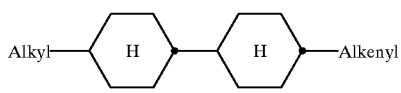
IIIc

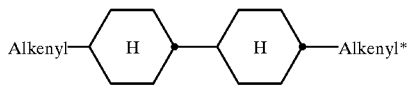
IIId

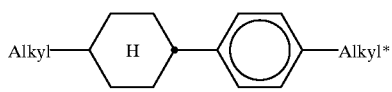
IIIe

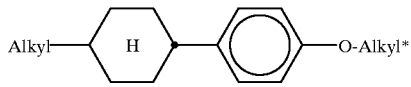
IIIf in which

Alkyl and Alkyl* are each, independently of one another, straight-chain alkyl having 1–6 carbon atoms, Alkenyl and Alkenyl* are each, independently of one another, a straight-chain alkenyl radical having 2–6 carbon atoms.

The medium according to the invention preferably comprises at least one compound of the formula IIIa and/or formula IIIb.

i) A medium which comprises at least one compound from the group consisting of the compounds IIIc1, IIIc2, IIId1–IIId4:

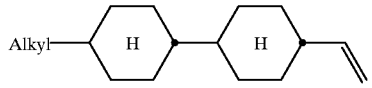
IIIc1

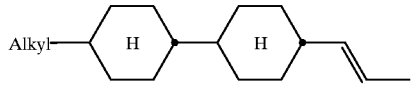
IIIc2

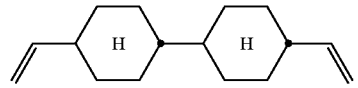
IIId1

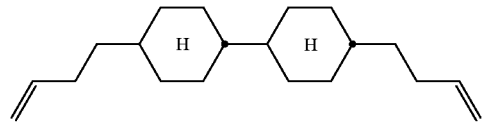
IIId2

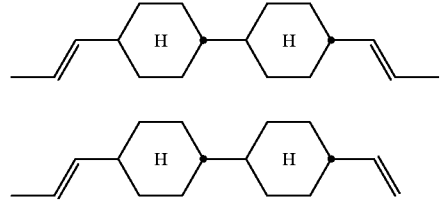
IIId3

IIId4 j) A medium which essentially consists of:
  10–30% by weight of one or more compounds of the formulae I1 and/or I2,
  30–70% by weight of one or more compounds of the formula I3, and
  5–50% by weight of one or more compounds of the formula II.

k) A medium which additionally comprises one or more compounds of the formulae IA and/or IB

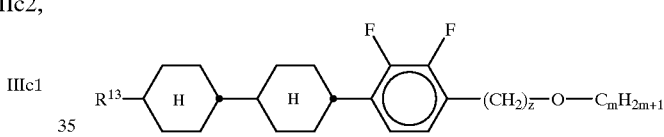
IA

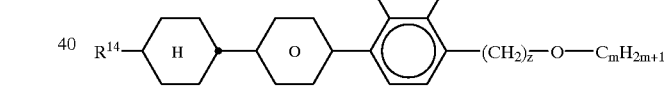
IB in which $R^7$ and $R^8$ are each, independently of one another, as defined for $R^{11}$ and $R^2$ above, and w and x are each, independently of one another, from 1 to 6.

l) A medium which additionally comprises one or more compounds of the formulae IC to IG

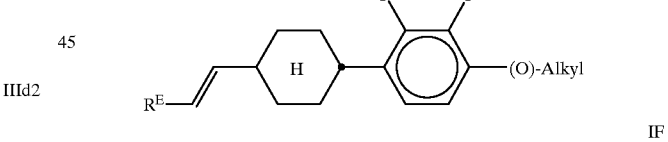
IC

ID

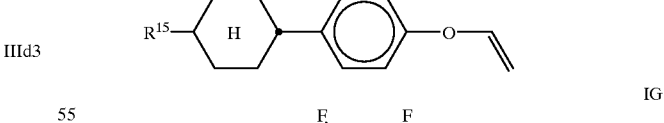
IE

IF

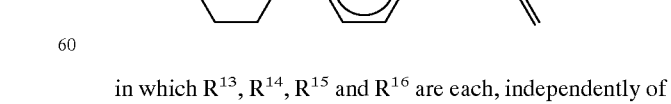
IG in which $R^{13}$, $R^{14}$, $R^{15}$ and $R^{16}$ are each, independently of one another, as defined for $R^{11}$, and z and m are each, independently of one another, 1–6. $R^E$ is H, $CH_3$, $C_2H_5$ or $n$-$C_3H_7$.

m) A medium in which the compound of the formula I1 is selected from the group consisting of I1a to I1f:

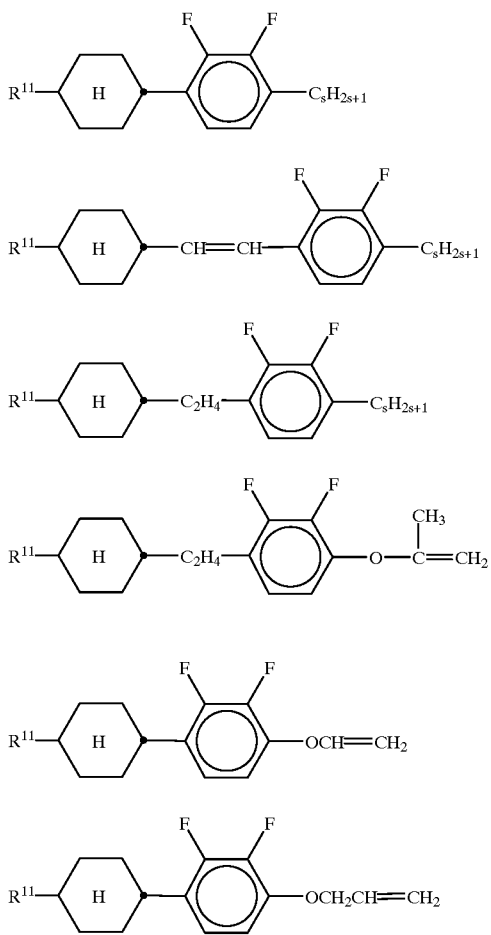

in which $R^{11}$ and s are as defined above. $R^{11}$ is preferably straight-chain alkyl having 1 to 6 carbon atoms, vinyl, 1E-alkenyl or 3E-alkenyl.

n) A medium comprising one or more compounds of the formula I1a, in which $R^{11}$ is straight-chain alkyl.

The invention furthermore relates to an electro-optical display having active matrix addressing based on the ECB effect, characterized in that it comprises as dielectric, a liquid-crystalline medium according to one of claims 1 to 13.

The liquid-crystal mixture preferably has a nematic phase range of at least 60K and a maximum flow viscosity of 30 mm²·s⁻¹ at 20° C.

The liquid-crystal mixture according to the invention has a ΔЄ of from about −0.5 to −5, in particular from about −3.0 to −4.5, where ΔЄ denotes the dielectric anisotropy.

The birefringence Δn in the liquid-crystal mixture is generally between 0.04 and 0.12, preferably between 0.06 and 0.11, and/or the dielectric constant Є∥ of greater than or equal to 3, preferably from 3.2 to 8.5.

The dielectrics may also comprise further additives which are known to the person skilled in the art and are described in the literature.

For example, 0–15% of pleochroic dyes can be added, furthermore conductive salts, preferably ethyldimethyl-dodecylammonium 4-hexoxybenzoate, tetrabutylammonium tetraphenylboranate or complex salts of crown ethers (cf., for example, Haller et al., Mol. Cryst. Liq. Cryst., Volume 24, pages 249–258 (1973)) for improving the conductivity, or substances for modifying the dielectric anisotropy, the viscosity and/or the alignment of the nematic phases. Such substances are described, for example, in DE-A 22 09 127, 22 40 864, 23 21 632, 23 38 281, 24 50 088, 26 37 430 and 28 53 728.

The individual components of the formulae I1, I2, I3, II and III in the liquid-crystal phases according to the invention are either known or their modes of preparation can easily be derived from the prior art by the person skilled in the relevant art, since they are based on standard methods which are described in the literature.

Corresponding compounds of the formulae I1, I2, I3 and II are described, for example, in EP 0 364 538.

Corresponding compounds of the formula III are described, for example, in German Patent 26 36 684 and German Patent 3321373.

The nematic liquid-crystal mixtures in the displays according to the invention generally comprise two components A and B, which themselves consist of one or more individual compounds.

Component A has significantly negative dielectric anisotropy and gives the nematic phase a dielectric anisotropy of ≦−0.3. It preferably comprises compounds of the formulae I1 and/or I2, I3 and II.

The proportion of component A is preferably between 45 and 100%, in particular between 60 and 100%.

For component A, one (or more) individual compound(s) having a ΔЄ<−0.8 is preferably selected. This value must be more negative the smaller the proportion of A in the mixture as a whole.

Component B has pronounced nematogeneity and a flow viscosity of not more than 30 mm²·s⁻¹ preferably not more than 25 mm²·s⁻¹, at 20° C.

Particularly preferred individual compounds of component B are extremely low-viscosity nematic liquid crystals having a viscosity of not more than 18 mm²·s⁻¹, preferably not more than 12 mm²·s⁻¹, at 20° C.

Component B has monotropic or enantiotropic nematogeneity, has no smectic phases and can prevent the occurrence of smectic phases in liquid-crystal mixtures down to very low temperatures. If, for example, a smectic liquid-crystal mixture is mixed with various materials of high nematogeneity, the degree of suppression of smectic phases that is achieved can be used to compare the nematogeneity of these materials.

A multiplicity of suitable materials is known to the person skilled in the art from the literature. Particular preference is given to compounds of the formula III.

In addition, these liquid-crystal phases can also contain more than 18 components, preferably from 18 to 25 components.

The phases preferably contain from 4 to 15, in particular 5 to 12, compounds of the formulae I1 and/or I2, I3, II and III.

Besides compounds of the formulae I1 and/or I2, I3, II and III, it is also possible for other constituents to be present, for example in an amount of up to 45% of the mixture as a whole, but preferably up to 35%, in particular up to 10%.

The other constituents are preferably selected from nematic or nematogenic substances, in particular known substances, from the classes consisting of the azoxybenzenes, benzylideneanilines, biphenyls, terphenyls, phenyl or cyclohexyl benzoates, phenyl or cyclohexyl cyclohexanecarboxylates, phenylcyclohexanes, cyclohexylbiphenyls, cyclohexylcyclohexanes, cyclohexylnaphthalenes, 1,4-bis-cyclohexylbiphenyls or cyclohexylpyrimidines, phenyl- or cyclohexyldioxanes, optionally halogenated stilbenes, benzyl phenyl ethers, tolans and substituted cinnamic acids.

The most important compounds which are suitable as constituents of liquid-crystalline phases of this type can be characterized by the formula IV $$R^9\text{—L—G—E—}R^{10} \qquad \text{IV}$$

in which L and E are each a carbocyclic or heterocyclic ring system from the group consisting of 1,4-disubstituted benzene and cyclohexane rings, 4,4'-disubstituted biphenyl, phenylcyclohexane and cyclohexylcyclohexane systems, 2,5-disubstituted pyrimidine and 1,3-dioxane rings, 2,6-disubstituted naphthalene, di- and tetrahydronaphthalene, quinazoline and tetrahydroquinazoline, G is

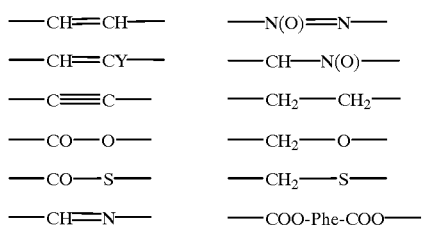

or a C—C single bond, Y is halogen, preferably chlorine, or —CN, and $R^9$ and $R^{10}$ are alkyl, alkenyl, alkoxy, alkanoyloxy or alkoxycarbonyloxy having up to 18, preferably up to 8, carbon atoms, or one of these radicals is alternatively CN, NC, $NO_2$, $CF_3$, F, Cl or Br.

In most of these compounds, $R^9$ and $R^{10}$ are different from one another, one of these radicals usually being an alkyl or alkoxy group. However, other variants of the proposed substituents are also common. Many such substances or mixtures thereof are commercially available. All these substances can be prepared by methods which are known from the literature.

It goes without saying to a person skilled in the art that the ECB mixture according to the invention may also comprise compounds in which, for example, H, N, O, Cl or F have been replaced by the corresponding isotopes.

The construction of the liquid-crystal display according to the invention corresponds to the conventional geometry, as described, for example, in EP-A 0 240 379.

The entire disclosure of all applications, patents and publications, cited above and below, and of corresponding German Application No. 198 29 080.2, filed Jun. 30, 1998 is hereby incorporated by reference.

EXAMPLES

The examples below are intended to illustrate the invention without representing a limitation. Above and below, percentages are percent by weight; all temperatures are given in degrees Celsius.

The following abbreviations are used for examples of compounds useful in the mixtures according to the invention:

(n and m=1–6; z=1–6)

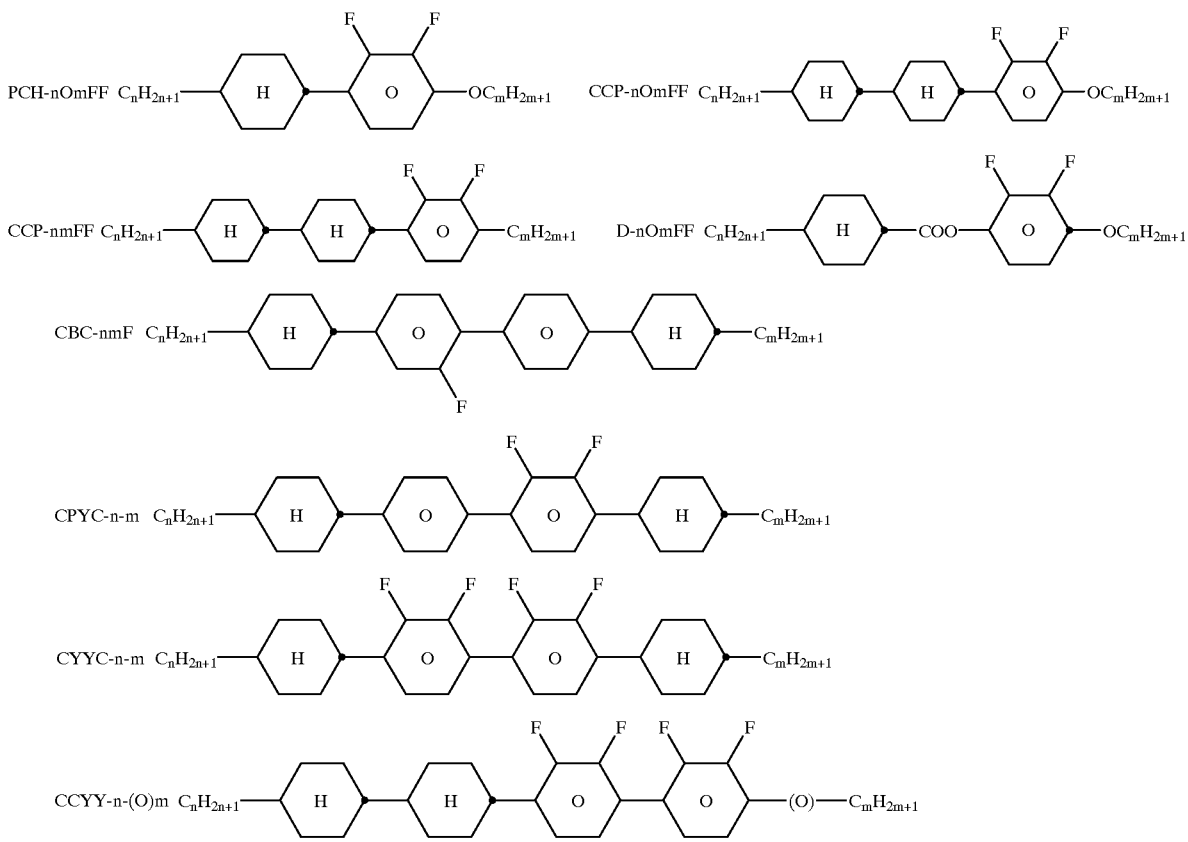

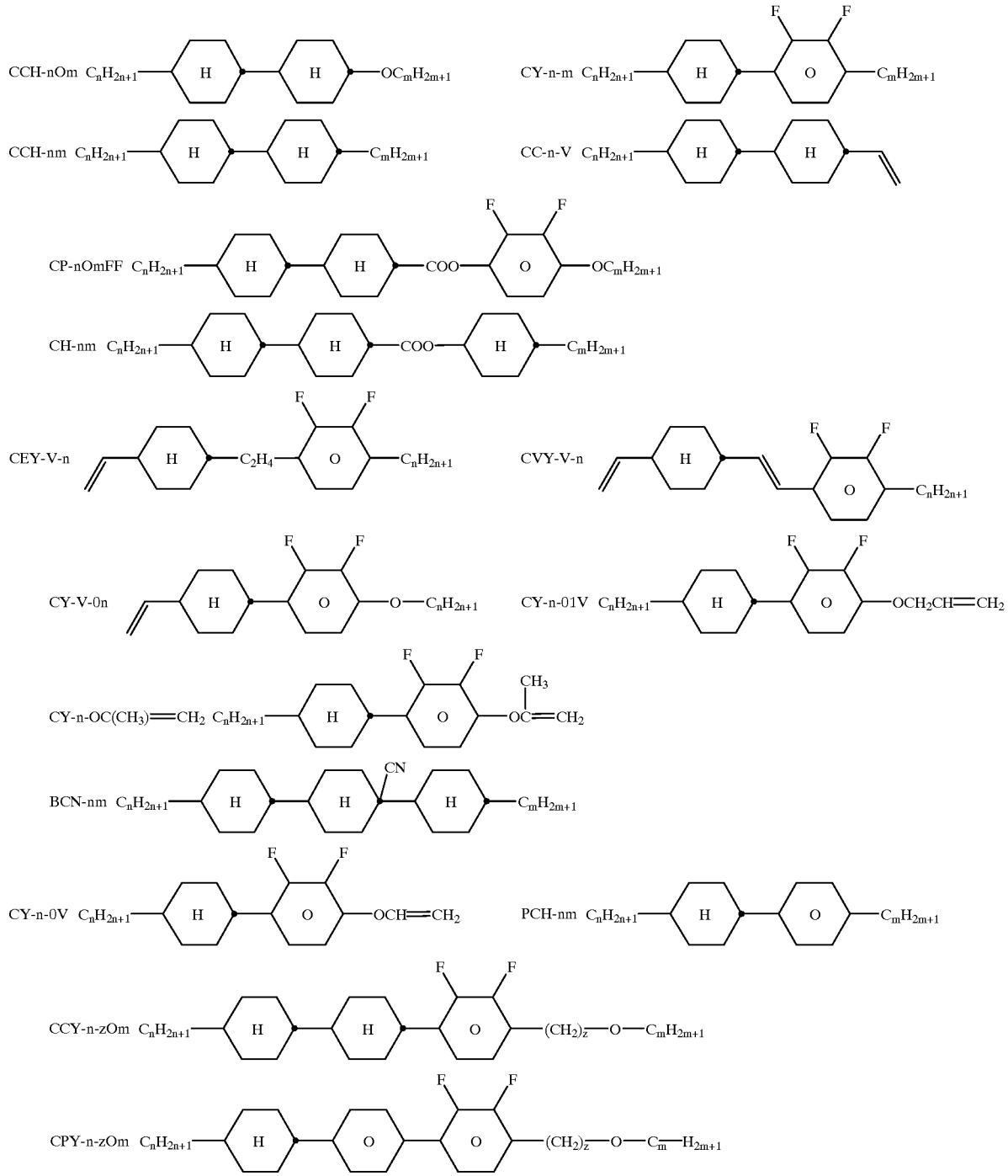

The threshold voltage values V(0,0), V(10,0) and V(90,0) indicated were measured at 20° C. in a conventional ECB cell having a layer thickness of 5 μm.

The abbreviations furthermore have the following meanings:

V(0,0) threshold voltage [V] 0% transmission viewing angle 0°
V(10.0) threshold voltage [V] 10% transmission viewing angle 0°
V(90.0) threshold voltage [V] 90% transmission viewing angle 0°

Δn optical anisotropy measured at 20° C. and 589 nm
Δε dielectric aniotropy at 20° C. and 1 kHz
c.p. clearing point [° C.]
$\gamma_1$ rotational viscosity measured at 20° C. [mPa·s]
S steepness of the characteristic line $$S = \frac{V(90.0)}{V(10.0)} - 1 \cdot 100$$

HR (20) voltage holding ratio at 20° C. [%]
HR (100) voltage holding ratio at 100° C. [%]
HR (UV) voltage holding ratio after UV exposure [%]

The display used to measure the threshold voltage has two plane-parallel outer plates at a separation of 5 μm and electrode layers covered by lecithin alignment layers on the inside of the outer plates, which produce a homeotropic alignment of the liquid crystals.

Example 1

| CC-5-V | 8.0% | S → N | < −30.0° C. |
|---|---|---|---|
| PCH-53 | 9.0% | clearing point | +74.5° C. |
| CY-5-1 | 14.0% | Δn | +0.0861 |
| PCH-502FF | 14.0% | ε∥ | 3.7 |
| CCP-202FF | 13.0% | Δε | −4.0 |
| CCP-302FF | 14.0% | $K_3/K_1$ | 1.09 |
| CCP-502FF | 5.0% | $\gamma_1$ | 168 |
| CCP-21FF | 12.0% | $V_o$ | 2.05 V |
| CCP-31FF | 11.0% | HR (20) | 81.8% |

Example 2

| CC-5-V | 6.0% | S → N | < −30.0° C. |
|---|---|---|---|
| PCH-53 | 12.0% | clearing point | +71.0° C. |
| CY-5-1 | 14.0% | Δn | +0.0859 |
| PCH-502FF | 14.0% | ε∥ | 3.8 |
| CCP-202FF | 15.0% | Δε | −4.0 |
| CCP-302FF | 15.0% | $K_3/K_1$ | 1.09 |
| CCP-502FF | 6.0% | $V_o$ | 1.97 V |
| CCP-21FF | 14.0% | HR (20) | 85.5% |
| CCP-31FF | 4.0% | | |

Example 3

| PCH-53 | 20.0% | clearing point | +107.5° C. |
|---|---|---|---|
| PCH-502FF | 12.0% | Δn | +0.01023 |
| CCP-302FF | 14.0% | | |
| CCP-502FF | 14.0% | | |
| CCP-21FF | 14.0% | | |
| CCP-31FF | 12.0% | | |
| CPYC-2-3 | 4.0% | | |
| CYYC-2-3 | 4.0% | | |
| CCYY-2-02 | 4.0% | | |
| CCYY-3-1 | 4.0% | | |

Example 4

| PCH-53 | 8.0% | S → N | < −30.0° C. |
|---|---|---|---|
| CY-3-1 | 5.0% | clearing point | +71.5° C. |
| CY-5-1 | 5.0% | Δn | +0.0928 |
| PCH-304FF | 8.0% | ε∥ | 4.1 |
| PCH-502FF | 12.0% | Δε | −5.2 |
| PCH-702FF | 10.0% | $V_o$ | 1.76 V |
| CCP-202FF | 13.0% | | |
| CCP-302FF | 15.0% | | |
| CCP-502FF | 13.0% | | |
| CCP-21FF | 6.0% | | |
| BCH-32F | 5.0% | | |

Example 5

| CEY-V-1 | 5.0% | clearing point | +53.5° C. |
|---|---|---|---|
| CVY-V-1 | 12.0% | Δn | +0.0905 |
| CY-V-02 | 5.0% | ε∥ | 4.9 |
| CY-3-0V | 5.0% | Δε | −5.3 |
| CY-5-01V | 12.0% | $V_o$ | 1.55 V |
| CY-3-0-C(CH₃)=CH₂ | 5.0% | | |
| PCH-502FF | 12.0% | | |
| CCP-302FF | 14.0% | | |
| CCP-502FF | 14.0% | | |
| CCP-21FF | 6.0% | | |
| CCP-31FF | 10.0% | | |

What is claimed is:

1. A liquid-crystalline medium based on a mixture of polar compounds of negative dielectric anisotropy, which comprises at least one compound of the formula I1 and/or I2

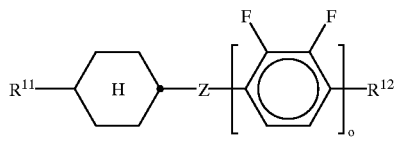

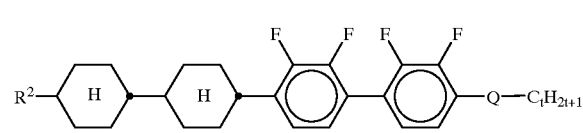

and at least one compound of the formula I3

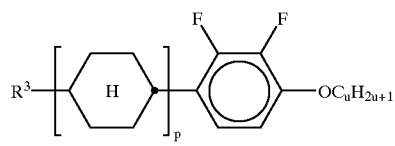

in which $R^{11}$, $R^2$ and $R^3$ are each, independently of one another, an unsubstituted alkyl or alkenyl radical having 1 to 12 carbon atoms, in which one or more non-adjacent $CH_2$ groups are optionally replaced by a radical selected from the group consisting of —O—, —S— and —C≡C—, $R^{12}$ is $C_sH_{2s+1}$, —O—C(CH₃)=CH₂ or —O—(CH₂)$_b$CH=CH₂

Q is —O— or a single bond,

Z is —C₂H₄—, —CH=CH— or a single bond, s, t, and u are each, independently of one another, from 1 to 6, o and p are each, independently of one another, 1 or 2 and b is 0, 1, 2, or 3.

2. A medium according to claim 1, which additionally comprises one or more compounds of the formula II

II

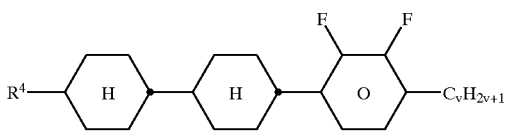

in which

R⁴ is as defined for R¹¹ and R², and v is from 1 to 6.

3. A medium according to claim 1 which additionally comprises one or more compounds of the formula III:

III

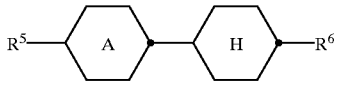

in which

R⁵ and R⁶ are each, independently of one another, as defined for R¹¹ and R² in claim 1, and

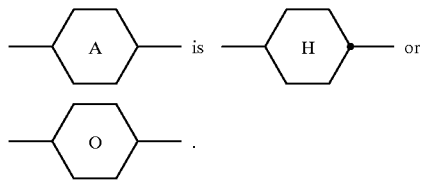

4. A medium according to claim 1 which consists essentially of four or more compounds selected from the formulae I1 and/or I2 and I3.

5. A medium according to claim 1 which comprises at least two compounds of the formula I3.

6. A medium according to claim 1 wherein the proportion of compounds of the formulae I1 and/or I2 in the mixture as a whole is at least 10% by weight.

7. A medium according to claim 1 wherein the proportion of compounds of the formula I3 in the mixture as a whole is at least 30% by weight.

8. A medium according to claim 2 wherein the proportion of compounds of the formula II in the mixture as a whole is at least 10% by weight.

9. A medium according to claim 3 wherein the proportion of compounds of formula III in the mixture as a whole is at least 5% by weight.

10. A liquid-crystalline medium according to claim 3, which comprises at least one compound selected from those of the formulae IIIa to IIIf:

IIIa

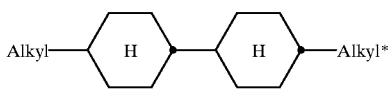

IIIb

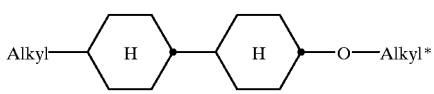

IIIc

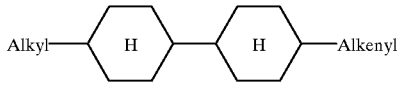

IIId

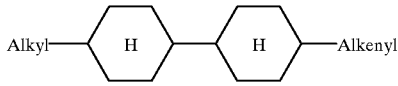

IIIe

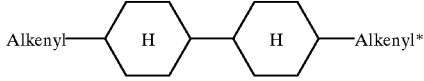

IIIf

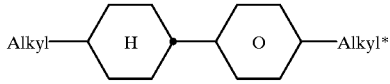

in which

Alkyl and Alkyl* are each, independently of one another, straight-chain alkyl having 1–6 carbon atoms, Alkenyl and Alkenyl* are each, independently of one another, a straight-chain alkenyl radical having 2–6 carbon atoms.

11. A liquid-crystalline medium according to claim 10, which comprises at least one compound of the formula IIIa and/or at least one compound of the formula IIIb.

12. A liquid-crystalline medium based on a mixture of polar compounds of negative dielectric anisotropy, which comprises at least one compound of the formula I1 and/or I2

I1

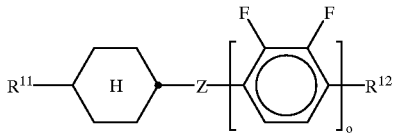

I2

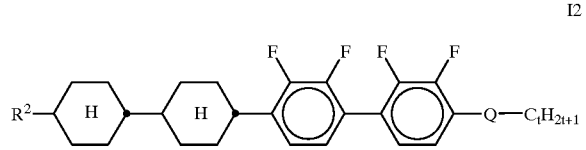

at least one compound of the formula I3

I3

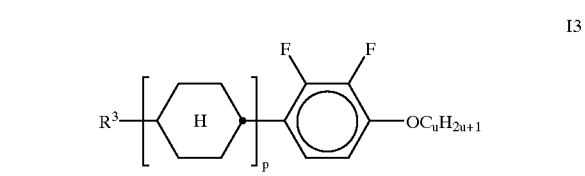

in which

R¹¹, R² and R³ are each, independently of one another, an unsubstituted alkyl or alkenyl radical having 1 to 12 carbon atoms, in which one or more non-adjacent CH₂ groups are optionally replaced by a radical selected from the group consisting of —O—, —S— and —C≡C—, R¹² is $C_sH_{2s+1}$, —O—C(CH₃)=CH₂ or —O—(CH₂)$_b$CH=CH₂

Q is —O— or a single bond,

Z is C$_2$H$_4$—, —CH=CH— or a single bond, s, t, and u are each, independently of one another, from 1 to 6, o and p are each, independently of one another, 1 or 2 and b is 0, 1, 2, or 3; and additionally comprises at least one compound selected from those of the formulae IIIa or IIIb

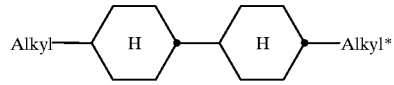
IIIa

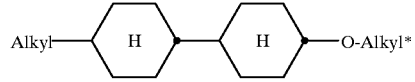
IIIb wherein Alkyl and Alkyl* are each, independently of one another, straight-chain alkyl having 1–6 carbon atoms; and additionally comprises one or more compounds of the formulae IA and/or IB

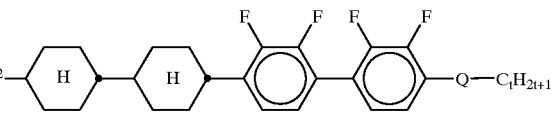

in which

R$^7$ and R$^8$ are each, independently of one another, as defined for R$^{11}$ and R$^2$ and, w and x are each, independently of one another, from 1 to 6.

13. A liquid-crystalline medium which consists essentially of:

10–30% by weight of one or more compounds of the formulae I1 and/or I2,

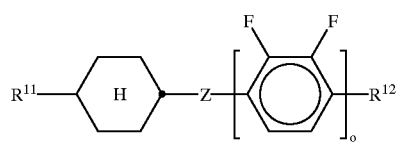
I1

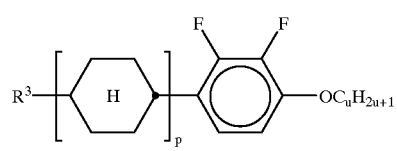
I2

30–70% by weight of one or more compounds of the formula I3, and

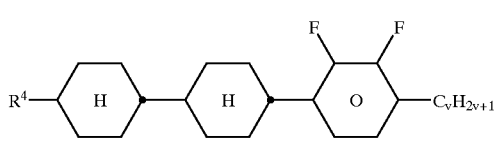
I3

5–50% by weight of one or more compounds of the formula II

II in which

R$^{11}$, R$^2$ and R$^3$ are each, independently of one another, an unsubstituted alkyl or alkenyl radical having 1 to 12 carbon atoms, in which one or more non-adjacent CH$_2$ groups are optionally replaced by a radical selected from the group consisting of —O—, —S— and —C≡C—, R$^{12}$ is C$_s$H$_{2s+1}$, —O—C(CH$_3$)=CH$_2$ or —O—(CH$_2$)$_b$CH=CH$_2$ Q is —O— or a single bond, Z is —C$_2$H$_4$—, —CH=CH— or a single bond, s, t, and u are each, independently of one another, from 1 to 6, o and p are each, independently of one another, 1 or 2, b is 0, 1, 2, or 3

R$^4$ is as defined for R$^{11}$ and R$^2$, and v is from 1 to 6.

14. An electro-optical display having active matrix addressing based on the ECB effect, which comprises, as dielectric, a liquid-crystalline medium according to claim 1.

15. An electro-optical display having active matrix addressing based on the ECB effect, which comprises, as dielectric, a liquid-crystalline medium according to claim 13.

16. The liquid-crystalline medium of claim 1, which comprises at least one compound of the formula I1.

17. The liquid-crystalline medium of claim, 1 which comprises at least one compound of the formula I2.

* * * * *

UNITED STATES PATENT AND TRADEMARK OFFICE
CERTIFICATE OF CORRECTION

PATENT NO.    : 6,217,953 B1
DATED         : April 17, 2001
INVENTOR(S)   : Heckmeier et al.

It is certified that error appears in the above-identified patent and that said Letters Patent is hereby corrected as shown below:

Column 18, claim 13,
Line 44, delete "$R^{11}$" and insert -- $R^1$ --

Signed and Sealed this

Twentieth Day of November, 2001

Attest:

*Nicholas P. Godici*

NICHOLAS P. GODICI
*Attesting Officer*        *Acting Director of the United States Patent and Trademark Office*